United States Patent
Hasegawa et al.

(10) Patent No.: US 12,124,612 B2
(45) Date of Patent: Oct. 22, 2024

(54) IDENTIFICATION ESTIMATE RISK EVALUATION APPARATUS, IDENTIFICATION ESTIMATE RISK EVALUATION METHOD, AND PROGRAM

(71) Applicant: NIPPON TELEGRAPH AND TELEPHONE CORPORATION, Tokyo (JP)

(72) Inventors: Satoshi Hasegawa, Musashino (JP); Takayuki Miura, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 208 days.

(21) Appl. No.: 17/764,203

(22) PCT Filed: Oct. 4, 2019

(86) PCT No.: PCT/JP2019/039362
§ 371 (c)(1),
(2) Date: Mar. 28, 2022

(87) PCT Pub. No.: WO2021/065004
PCT Pub. Date: Apr. 8, 2021

(65) Prior Publication Data
US 2022/0350924 A1 Nov. 3, 2022

(51) Int. Cl.
*G06F 21/00* (2013.01)
*G06F 21/62* (2013.01)
*G09C 1/00* (2006.01)

(52) U.S. Cl.
CPC ........... *G06F 21/6254* (2013.01); *G09C 1/00* (2013.01)

(58) Field of Classification Search
CPC .............................. G06F 21/6254; G09C 1/00
See application file for complete search history.

(56) References Cited

U.S. PATENT DOCUMENTS

2020/0327252 A1\* 10/2020 Mcfall .................... G06F 21/78

OTHER PUBLICATIONS

Ikarashi et al., "k-anonymous Microdata Release via Post Randomization Method", In International Workshop on Security, arXiv:1504.05353v1, Apr. 21, 2015, pp. 225-241.

\* cited by examiner

*Primary Examiner* — Jeffrey C Pwu
*Assistant Examiner* — Thong P Truong
(74) *Attorney, Agent, or Firm* — XSENSUS LLP

(57) ABSTRACT

An identification-estimation risk assessment apparatus includes a first calculation unit for calculating a first value $\Sigma_\gamma \Pr[\Delta(t)=t'o\gamma]$, which is a sum related to all shuffles of a probability $\Pr[\Delta(t)=t'o\gamma]$ that a table $\Delta(t)$ obtained by anonymizing the original table t through randomization $\Delta$ coincides with a table t'o$\gamma$ represented as a composite of a shuffle $\gamma$ and the anonymized table t'; a second calculation unit for calculating a second value $\Sigma_{\gamma(r)=r'}\Pr[\Delta(t)=t'o\gamma]$, which is a sum related to a shuffle that satisfies $\gamma(r)=r'$ of the probability $\Pr[\Delta(t)=t'o\gamma]$; and a third calculation unit for calculating a third value $\Sigma_{\gamma(r)=r'}\Pr[\Delta(t)=t'o\gamma]/\Sigma_\gamma \Pr[\Delta(t)=t'o\gamma]$ as a risk assessment value of a risk that a record number r is identified and estimated as corresponding to a record number r', based on the first value and the second value.

9 Claims, 3 Drawing Sheets

|   | ADDRESS | AGE | GENDER |
|---|---|---|---|
| 1 | MUSASHINO-SHI, TOKYO | 50 | MALE |
| 2 | YOKOSUKA-SHI, KANAGAWA | 55 | MALE |
| 3 | MUSASHINO-SHI, TOKYO | 50 | MALE |

Fig.1

|   | attr1 | attr2 |
|---|---|---|
| 1 | a | A |
| 2 | b | B |
| 3 | c | C |

(A) ORIGINAL TABLE t

|   | attr1 | attr2 |
|---|---|---|
| 1 | a | C |
| 2 | b | B |
| 3 | b | A |

(B) ANONYMIZED TABLE t'

Fig.2

IDENTIFICATION ESTIMATE RISK EVALUATION APPARATUS, IDENTIFICATION ESTIMATE RISK EVALUATION METHOD, AND PROGRAM

CROSS-REFERENCE TO RELATED APPLICATION

The present application is based on PCT filing PCT/JP2019/039362, filed Oct. 4, 2019, the entire contents of which are incorporated herein by reference.

TECHNICAL FIELD

The present invention relates to a technology for performing anonymization processing on individual data for a database using a probabilistic method.

BACKGROUND ART

Technologies for performing anonymization processing on individual data for a database using a probabilistic method include a method described in NPL 1. In a post randomization method (PRAM) described in NPL 1, a value is randomly rewritten in accordance with a certain probability, i.e., data is randomized.

Pk-anonymity described in NPL 1 is a method for quantitatively assessing to what extent anonymization processing has been performed by PRAM. If the database satisfies Pk-anonymity, it can be ensured that "an individual cannot be identified with a probability of 1/k or more".

A table that is a database in a table form will be dealt with below.

CITATION LIST

Non Patent Literature

[NPL 1] Dai Ikarashi, Ryo Kikuchi, KojiChida, and Katsumi Takahashi, "k-anonymous microdata release via post randomization method," In International Workshop on Security 2015, pp. 225-241, 2015.

SUMMARY OF THE INVENTION

Technical Problem

Pk-anonymity makes an assessment while assuming an attacker with any background knowledge. For this reason, in the assessment using Pk-anonymity, the probability that an individual is identified is estimated as being higher than necessary. In other words, there is a problem in that the risk that a record in a randomized table is identified and estimated is assessed as being greater than necessary.

The present invention aims to provide a technology for assessing the risk that a record in a randomized table is identified and estimated in the case where knowledge that an attacker has about the table is fixed.

Means for Solving the Problem

One aspect of the present invention is an identification-estimation risk assessment apparatus that calculates a risk assessment value of a risk that a record number r is identified and estimated as corresponding to a record number r' from an original table t, an anonymized table t', a record number r∈[N] in the original table t, and a record number r'∈[N] in the anonymized table t', wherein [N]={1, 2, . . . , N} (here, N is an integer of 1 or more) and a shuffle is a mapping of [N]→[N], the apparatus including: a first calculation unit for calculating a first value $\Sigma_\gamma \Pr[\Delta(t)=t'\circ\gamma]$, which is a sum related to all shuffles of a probability $\Pr[\Delta(t)=t'\circ\gamma]$ that a table $\Delta(t)$ obtained by anonymizing the original table t through randomization $\Delta$ coincides with a table $t'\circ\gamma$ represented as a composite of a shuffle $\gamma$ and the anonymized table t'; a second calculation unit for calculating a second value $\Sigma_{\gamma(r)=r'}\Pr[\Delta(t)=t'\circ\gamma]$, which is a sum related to a shuffle that satisfies $\gamma(r)=r'$ of the probability $\Pr[\Delta(t)=t'\circ\gamma]$; and a third calculation unit for calculating, as the risk assessment value, a third value $\Sigma_{\gamma(r)=r'}\Pr[\Delta(t)=t'\circ\gamma]/\Sigma_\gamma \Pr[\Delta(t)=t'\circ\gamma]$ based on the first value $\Sigma_\gamma \Pr[\Delta(t)=t'\circ\gamma]$ and the second value $\Sigma_{\gamma(r)=r'}\Pr[\Delta(t)=t'\circ\gamma]$.

Effects of the Invention

According to the present invention, it is possible to assess the risk that a record in a randomized table is identified and estimated in the case where knowledge that an attacker has about the table is fixed.

BRIEF DESCRIPTION OF DRAWINGS

FIG. 1 is a diagram showing an example of a table.
FIG. 2 is a diagram showing an example of an original table t and an anonymized table t'.

DESCRIPTION OF EMBODIMENTS

Figure 3:
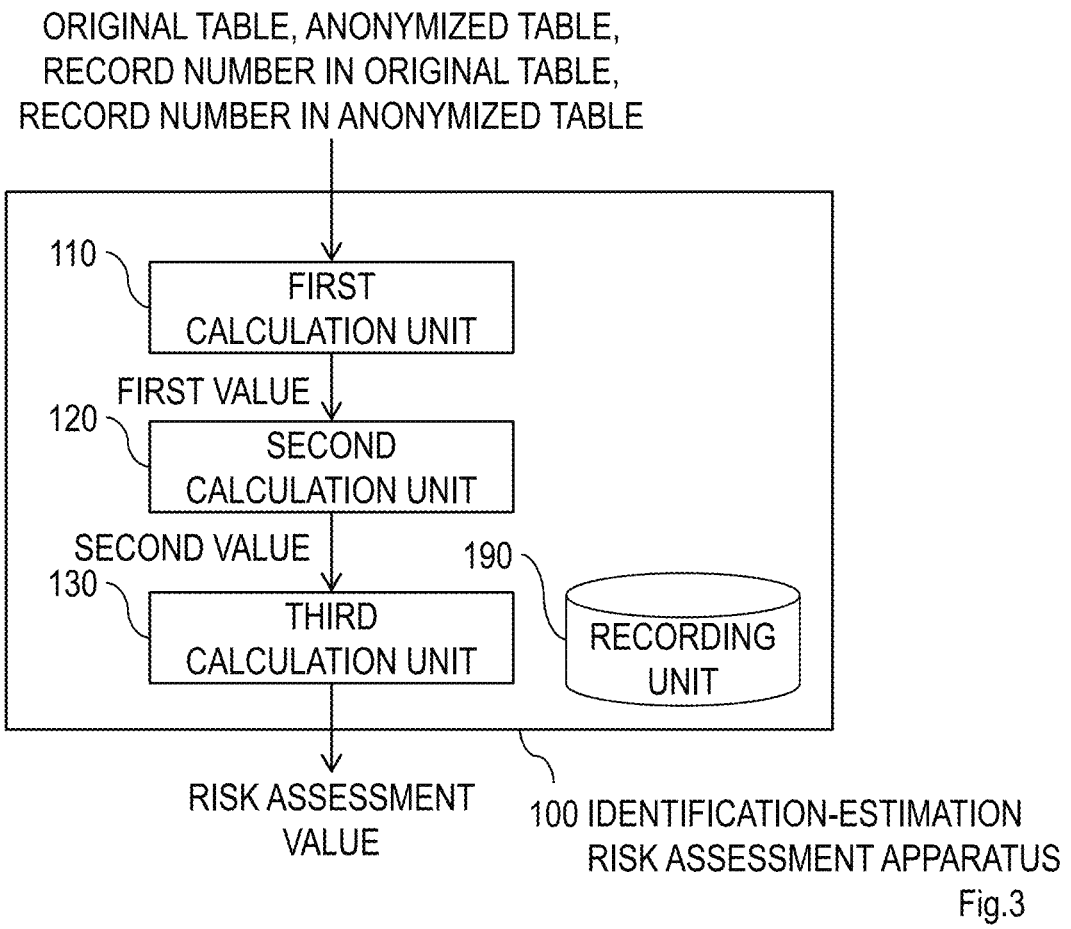
FIG. 3 is a block diagram showing a configuration of an identification-estimation risk assessment apparatus 100.

Hereinafter, an embodiment of the present invention will be described in detail. Note that constituent units having the same functions are assigned the same reference numerals, and redundant description is omitted.

Prior to the description of the embodiment, a notation method in this specification will be described.

_ (underscore) denotes a subscript. For example, "$x^{y\_z}$" represents that $y_z$ is a superscript for x, and "$x_{y\_z}$" represents that $y_z$ is a subscript for x.

Superscripts "^" and "~" for a certain letter x, as in "^x" and "~x", should originally be written directly above "x", but are written as "^x" and "~x" due to the restrictions of the descriptive notation of the specification.

TECHNICAL BACKGROUND

Definitions

For sets A and B, a set of all mappings from. A to B is denoted as A⇒B. For a positive integer N, [N]={1, . . . , N}.
[Table]
R is a set of individuals. Also, N=|R| (here, N is an integer of 1 or more). That is to say, N represents the cardinality of the set R.

Labels 1, . . . , N are assigned to respective individuals who are the elements of the set R. A is a set of all attributes, $V_a$ is a set of attribute values of an attribute a for each a∈A, and $V = \cup_{a \in A} V_a$. At this time, $T=[N] \Rightarrow V$, and each $t \in T$ is called a table. For a table t, $r \in [N]$ is called a record number of the table t.

FIG. 1 shows an example of a table. A set A of all attributes={address, age, gender,} a set $A_{gender}$ of attribute values of the attribute "gender"={male, female}, and the table in FIG. 1 is a mapping from [3]={1, 2, 3} to a group of attribute values of the three attributes A={address, age, gender}.

[Table Protection]

For table sets T and T', a mapping $\Delta: T \to T'$ is to output a table $t' \in T'$ in response to an input table $t \in T$ in accordance with a probability distribution corresponding to t, and this mapping $\Delta$ is referred to as randomization.

[Shuffle]

A mapping $\gamma: [N] \to [N]$ is called a shuffle. A set of all shuffles $\gamma$ is $\Gamma$. That is to say, $\Gamma$ is a set of all patterns of shuffles.

[PRAM]

PRAM is an anonymization processing method that satisfies Pk-anonymity. PRAM protects privacy by probabilistically replacing an attribute value of each record in a table based on a matrix called a transition probability matrix. Here, a transition probability matrix refers to a $|V_a| \times |V_a|$ matrix $P_a$ that has, as an element, a probability $Pr(v'_a|v_a)$ (which is called a transition probability) that an attribute value $v_a \in V_a$ of a certain attribute $a \in A$ is replaced with an attribute value $v'_a \in V_a$.

As a method for setting a transition probability, a method is conceivable in which a value is retained with a certain probability $\rho_a$, and the value is randomly rewritten with a probability of $1-\rho_a$, as expressed by the following equation.

[Math. 1]
$$Pr(v'_a | v_a) = \begin{cases} \rho_a + \dfrac{1-\rho_a}{|V_a|} & (v_a = v'_a) \\ \dfrac{1-\rho_a}{|V_a|} & (v_a \neq v'_a) \end{cases}$$

Accordingly, the transition probability matrix $P_a$ is represented by the following equation.

[Math. 2]
$$P_a = \begin{pmatrix} \rho_a + \dfrac{1-\rho_a}{|V_a|} & \dfrac{1-\rho_a}{|V_a|} & \cdots & \dfrac{1-\rho_a}{|V_a|} \\ \dfrac{1-\rho_a}{|V_a|} & \rho_a + \dfrac{1-\rho_a}{|V_a|} & & \vdots \\ \vdots & & \ddots & \vdots \\ \dfrac{1-\rho_a}{|V_a|} & \cdots & \cdots & \rho_a + \dfrac{1-\rho_a}{|V_a|} \end{pmatrix}$$

<<Risk Assessment>>

Here, a description will be given of an identification-estimation probability used in the risk assessment in the embodiment of the present invention.

When $t \in T$, $t' \in T'$, $r, r' \in [N]$, and $t \in T$ are tables that an attacker has as background knowledge, an identification-estimation probability n (t, t', r, r') is defined as the following equation.

[Math. 3]
$$\eta(t,t',r,r') = Pr[\Gamma(r)=r'|\Delta(t)=t' \circ \Gamma] \quad (1)$$

Here, t is an original table, t' is an anonymized table, r is a record number in the original table t, and r' is a record number of the anonymized table t'.

When an attacker who has a table t as background knowledge is assumed, the identification-estimation probability $\eta(t, t', r, r')$ represents the probability that the record number r in the original table t is identified and estimated as corresponding to the record number r' in the anonymized table t'.

A defining equation (1) of the identification-estimation probability n (t, t', r, r') includes a probability variable $\Gamma$. Thus, if the equation (1) is deformed using an instance $\gamma \Sigma \Gamma$, it results in the following equation.

[Math. 4]
$$\eta(t, t', r, r') = \frac{Pr(\Gamma(r) = r' \wedge \Delta(t) = t' \circ \Gamma)}{Pr[\Delta(t) = t' \circ \Gamma]} \quad (2)$$
$$= \frac{\sum_{\gamma \in \Gamma} Pr[\Gamma = \gamma] Pr[\gamma(r) = r' \wedge \Delta(t) = t' \circ \gamma]}{\sum_{\gamma \in \Gamma} Pr[\Gamma = \gamma] Pr[\Delta(t) = t' \circ \gamma]}$$
$$= \frac{\sum_{\gamma(r)=r'} \frac{1}{N!} Pr[\Delta(t) = t' \circ \gamma]}{\sum_{\gamma} \frac{1}{N!} Pr[\Delta(t) = t' \circ \gamma]}$$
$$= \frac{\sum_{\gamma(r)=r'} Pr[\Delta(t) = t' \circ \gamma]}{\sum_{\gamma} Pr[\Delta(t) = t' \circ \gamma]}$$

Accordingly, the probability that the record number r is identified and estimated as corresponding to the record number r' can be obtained by calculating the denominator and the numerator of the equation (2).

(Method for Calculating Denominator of Equation (2))

When the probability that a record with a record number i in the original table t becomes a record with a record number j in the anonymized table t' through randomization $\Delta$ is $a_{ij}$ ($i \in [N]$, $j \in [N]$), $\Sigma_\gamma Pr[\Delta(t)=t' \circ \gamma]$ is calculated by the following equation.

[Math. 5]
$$\Sigma_\gamma Pr[\Delta(t)=t' \circ \gamma] = \Sigma_\gamma \Pi_{i \in [N]} a_{i\gamma(i)} \quad (3)$$

If a matrix with $a_{ij}$ as a (i, j)th element is A, the right side of the equation (3) coincides with an equation called a permanent of the matrix A.

Note that, for a permanent of an N×N matrix, a method of calculation with a complexity $O(2^N)$ (Ryser's Algorithm) is known.

(Method for Calculating Numerator of Equation (2))

$\Sigma_{\gamma(r)=r'} Pr[\Delta(t)=t' \circ \gamma]$ can be calculated by performing an operation similar to cofactor expansion of a matrix (hereafter, this operation is called pseudo-cofactor expansion). Pseudo-cofactor expansion of (i, j) for the matrix A is defined as the product of the (i, j)th element of A and the permanent of a (N−1)×(N−1) matrix excluding the ith rows and the jth column.

Accordingly, $\Sigma_{\gamma(r)=r'} Pr[\Delta(t)=t' \circ \gamma]$ can be calculated as the pseudo-cofactor expansion of (r, r') for the matrix A, i.e., the product of the (r, r') element of A and the permanent of the (N−1)×(N−1) matrix excluding the rth row and the r'th column.

Specific Example

Methods for calculating the identification-estimation probability will be described in detail below. First, the premise common to the calculation methods will be described. Here, the identification-estimation probability in the case of using PRAM as randomization is calculated.

FIG. 2 shows two tables to be subjected to the calculation, namely the original table t and the anonymized table t'. A transition probability matrix $P_{attr1}$ of an attribute attr1 and a transition probability matrix $P_{attr2}$ of an attribute attr2 are given by the following equation.

$$P_{attr1} = P_{attr2} = \begin{pmatrix} 0.8 & 0.1 & 0.1 \\ 0.1 & 0.8 & 0.1 \\ 0.1 & 0.1 & 0.8 \end{pmatrix} \quad \text{[Math. 6]}$$

The transition probability matrix $P_{attr1}$ and the transition probability matrix $P_{attr2}$ represent that the probability that a certain attribute value takes the same value as a result of randomization is 0.8, and the probability that this attribute value takes other values is 0.1, respectively.

Based on the above premise, methods for calculating the identification-estimation probability η(t, t', 1, 1) will be described.

(Calculation Method 1)

First, consideration is given to the case where there has been no change in the arrangement due to the shuffle κ. If there has been no change in the arrangement due to the shuffle κ, Pr[Δ(t)=t'] is the product of the probability that an element in the original table t transitions to a corresponding element in the anonymized table t', i.e., Pr[Δ(t)=t']=(the probability that a→a)×(the probability that A→C)×(the probability that b→b)×(the probability that B→B)×(the probability that c→b)×(the probability that C→A). Accordingly, Pr[Δ(t)=t'] is calculated by the following equation.

$$Pr = [\Delta(t) = t'] = 0.8 \times 0.1 \times 0.8 \times 0.8 \times 0.1 \times 0.1 \quad \text{[Math. 7]}$$
$$= 0.000512$$

The probability Pr[Δ(t)=t'∘γ] is similarly calculated for all patterns of shuffles.

Then, the denominator of the equation (2) can be obtained by taking the sum of the probability Pr[Δ(t)=t'∘γ]. Meanwhile, for the numerator of the equation (2), the sum of the probability Pr[Δ(t)=t'∘γ] for the shuffle that satisfies γ(1)=1', of all patterns of shuffles, is taken.

As understood from the above, the probability calculation needs to be performed for all patterns of shuffles in the calculation method 1, and therefore the complexity is O(N!).

(Calculation Method 2)

Here, a description will be given of a method using a matrix permanent and pseudo-cofactor expansion.

First, calculation of $\Sigma_\gamma Pr[\Delta(t)=t'\circ\gamma]$, which is the denominator of the equation (2), will be described. Initially, the matrix A is obtained. For example, the probability that a record with a record number 1 in the original table t transitions to a record with a record number 1 in the anonymized table t' is the product of 0.8, which is the probability that a→a, and 0.1, which is the probability that A→C, i.e., 0.08. The matrix A is obtained by subsequently performing calculation similarly.

$$A = \begin{pmatrix} 0.08 & 0.01 & 0.08 \\ 0.01 & 0.64 & 0.08 \\ 0.08 & 0.01 & 0.01 \end{pmatrix} \quad \text{[Math. 8]}$$

Next, the permanent perm (A) of the matrix A is calculated. If calculation is performed in accordance with the defining equation of the permanent, the following result is obtained.

$$perm(A) = 0.08 \times 0.64 \times 0.01 + \quad \text{[Math. 9]}$$
$$0.01 \times 0.08 \times 0.08 + 0.08 \times 0.01 \times 0.01 + 0.08 \times 0.64 \times 0.08 +$$
$$0.01 \times 0.01 \times 0.01 + 0.08 \times 0.08 \times 0.01 = 0.004745$$

Although perm(A) is calculated here using a primitive method according to the defining equation of permanent, perm(A) can be efficiently calculated by using Ryser's Algorithm, as mentioned above.

Meanwhile, for $\Sigma_{\gamma(r)=r'} Pr[\Delta(t)=t'\circ\gamma]$, which is the numerator of the equation (2), pseudo-cofactor expansion of the matrix is used. In the case of calculating the identification-estimation probability η(t, t', 1, 1), using pseudo-cofactor expansion of the matrix A while assuming that i=1, j=1, $$0.08 \times perm\begin{pmatrix} 0.64 & 0.08 \\ 0.01 & 0.01 \end{pmatrix} = 0.000576 \quad \text{[Math. 10]}$$

is the numerator of the equation (2).

From the above, η(t, t', 1, 1)=0.000576/0.004745=0.12139.

For reference, if $\Sigma_{\gamma(r)=r'} Pr[\Delta(t)=t'\circ\gamma]$ is calculated for all combinations of r∈[3] and r'∈[3], and a matrix is created in which the results of r'=1, 2, 3 for r=1 are arrayed in the first row, the results of r'=1, 2, 3 for r=2 are arrayed in the second row, and the results of r'=1, 2, 3 for r=3 are arrayed in the third row, $$\begin{pmatrix} 0.121390 & 0.01896 & 0.876712 \\ 0.013698 & 0.971127 & 0.015173 \\ 0.864910 & 0.026975 & 0.108113 \end{pmatrix} \quad \text{[Math. 11]}$$

is obtained.

In the calculation method 2, the complexity is $O(2^N)$ due to using Ryser's Algorithm.

First Embodiment

Figure 4:
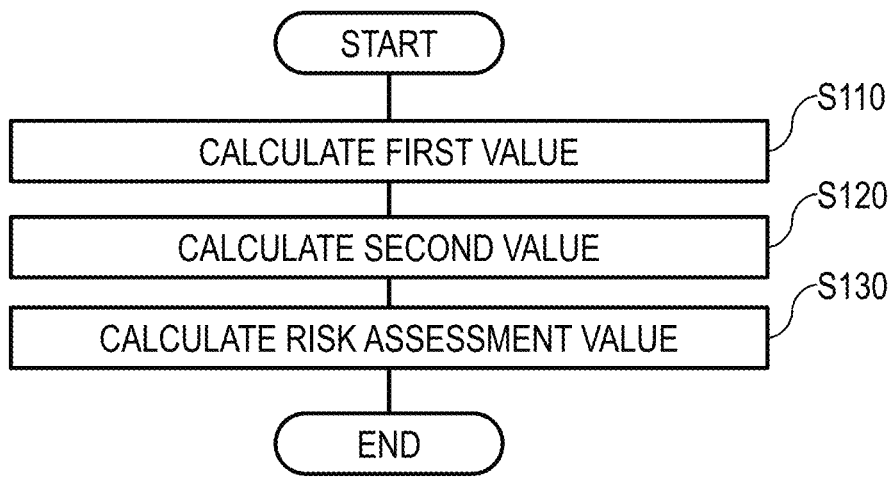
FIG. 4 is a flowchart showing an operation of the identification-estimation risk assessment apparatus 100.

The identification-estimation risk assessment apparatus 100 will be described below with reference to FIGS. 3 and 4. FIG. 3 is a block diagram showing a configuration of the identification-estimation risk assessment apparatus 100. FIG. 4 is a flowchart showing an operation of the identification-estimation risk assessment apparatus 100. As shown in FIG. 3, the identification-estimation risk assessment apparatus 100 includes a first calculation unit 110, a second calculation unit 120, a third calculation unit 130, and a recording unit 190. The recording unit 190 is a constituent unit that records, as appropriate, information required for processing performed by the identification-estimation risk assessment apparatus 100.

The identification-estimation risk assessment apparatus 100 calculates a risk assessment value of the risk that the record number r is identified and estimated as corresponding to the record number r' from the original table t, the anonymized table t', a record number r∈[N] in the original table t, and a record number r'∈[N] in the anonymized table t'.

An operation of the identification-estimation risk assessment apparatus 100 will be described in accordance with FIG. 4.

In S110, the first calculation unit 110 receives input of the original table t and the anonymized table t'. The first calculation unit 110 calculates, based on the original table t and the anonymized table t', a first value $\Sigma_\gamma Pr[\Delta(t)=t'\circ\gamma]$, which is the sum related to all shuffles of the probability $Pr[\Delta(t)=t'\circ\gamma]$ that a table $\Delta(t)$ obtained by anonymizing the original table t through the randomization $\Delta$ coincides with a table t'∘γ represented as a composite of the shuffle γ and the anonymized table t', and outputs the result. PRAM can be used in the randomization $\Delta$, for example. In this case, the probability $Pr[\Delta(t)=t'\circ\gamma]$ can be calculated using the transition probability.

The first calculation unit 110 may alternatively calculate the first value $\Sigma_\gamma Pr[\Delta(t)=t'\circ\gamma]$ using the following equation.

$$\Sigma_\gamma Pr[\Delta(t)=t'\circ\gamma]=\Sigma_\gamma \Pi_{i\in[N]} a_{i\gamma(i)} \quad [\text{Math. 12}]$$

Here, $a_{ij}$ (i∈[N], j∈[N]) represents the probability that the record with the record number i in the original table t becomes the record with the record number j in the anonymized table t' through the randomization $\Delta$.

In S120, the second calculation unit 120 receives input of the original table t, the anonymized table t', the record number r in the original table t, and the record number r' in the anonymized table t'. The second calculation unit 120 calculates a second value $\Sigma_{\gamma(r)=r'} Pr[\Delta(t)=t'\circ\gamma]$, which is the sum related to the shuffle that satisfies γ(r)=r' of the probability $Pr[\Delta(t)=t'\circ\gamma]$, based on the original table t, the anonymized table t', the record number r in the original table t, and the record number r' in the anonymized table t', and outputs the result.

Wherein A is a matrix with the probability $a_{ij}$ that the ith record in the original table t becomes the jth record in the anonymized table t' as a result of the randomization $\Delta$ as the (i, j)th element, the second calculation unit 120 may calculate the second value $\Sigma_{\gamma(r)=r'} Pr[\Delta(t)=t'\circ\gamma]$ through pseudo-cofactor expansion of (r, r') for the matrix $\Delta$.

In S130, the third calculation unit 130 receives input of the first value $\Sigma_\gamma Pr[\Delta(t)=t'\circ\gamma]$ calculated in S110 and the second value $\Sigma_{\gamma(r)=r'} Pr[\Delta(t)=t'\circ\gamma]$ calculated in S120, calculates, as a risk assessment value, a third value $\Sigma_{\gamma(r)=r'} Pr[\Delta(t)=t'\circ\gamma]/\Sigma_\gamma Pr[\Delta(t)=t'\circ\gamma]$ based on the first value $\Sigma_\gamma Pr[\Delta(t)=t'\circ\gamma]$ and the second value $\Sigma_{\gamma(r)=r'} Pr[\Delta(t)=t'\circ\gamma]$, and outputs the result.

According to the embodiment of the present invention, it is possible to assess the risk that a record in a randomized table is identified and estimated in the case where knowledge that an attacker has about the table is fixed.

<Supplementary Note>

Figure 5:
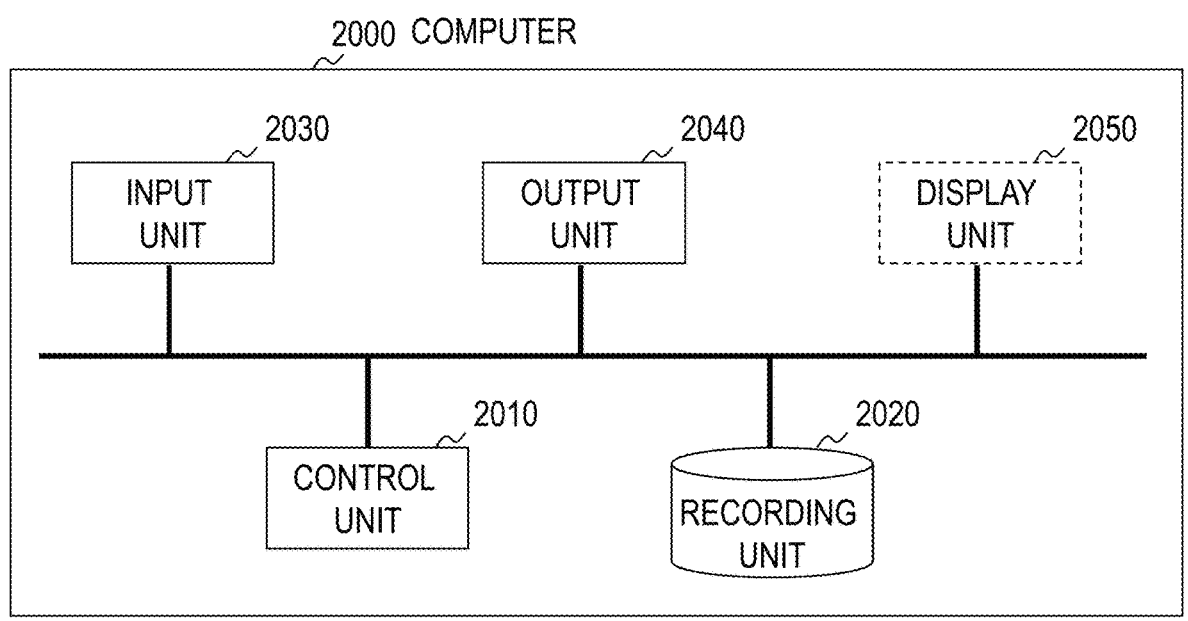
FIG. 5 is a diagram showing an example of a functional configuration of a computer that realizes each apparatus in an embodiment of the present invention.

FIG. 5 is a diagram showing an example of a functional configuration of a computer that realizes the above-described apparatus. Processing performed in the above-described apparatus can be implemented by causing a recording unit 2020 to load a program for causing a computer to function as the above-described apparatus to operate a control unit 2010, an input unit 2030, an output unit 2040, and so on.

For example, the apparatus of the present invention has, as a single hardware entity, an input unit to which a keyboard or the like can be connected, an output unit to which a liquid crystal display can be connected, a communication unit to which a communication device (e.g., a communication cable) capable of communicating with a device outside the hardware entity can be connected, a CPU (Central Processing Unit, which may also include a cache memory, a register, or the like), a RAM and a ROM, which are memories, an external storage device, which is a hard disk, and a bus that connects the input unit, the output unit, the communication unit, the CPU, the RAM, the ROM, and the external storage device to each other such that data can be exchanged therebetween. Further, the hardware entity may also be provided with a device (drive) or the like that can write and read data to and from a recording medium such as a CD-ROM, as necessary. A physical entity equipped with those hardware resources is, for example, a general-purpose computer.

A program required to realize the above-described functions, data required for processing of this program, or the like is stored in the external storage device of the hardware entity (not limited to the external storage device, for example, the program may alternatively be stored in a ROM, which is a read-only storage device). Data or the like that is obtained as a result of processing of the program is stored in the RAM, the external storage device, or the like, as appropriate.

In the hardware entity, each program stored in the external storage device (or the ROM etc.) and data required for processing of the program are loaded to the memory as needed, and is interpreted, executed, and processed by the CPU, as appropriate. As a result, the CPU realizes predetermined functions (the above-described functional units represented as " . . . unit", " . . . means", etc.).

The present invention is not limited to the above embodiment, and may be modified, as appropriate, without departing from the gist of the present invention. The processing described in the above embodiment may not only executed in time series in the above-described order, but also executed in parallel or separately, in accordance with the processing capacity of the device that executes the processing, or as needed.

As already described, when the processing functions of the hardware entity (the apparatus of the present invention) described in the above embodiment are realized by a computer, the processing content of the functions that the hardware entity should have are described by the program. By executing this program on the computer, the processing functions of the above-described hardware entity are realized on the computer.

The program that describes this processing content can be recorded in a computer-readable recording medium. The computer-readable recording medium may be of any kind, e.g., a magnetic recording device, an optical disk, a magneto-optical recording medium, a semiconductor memory, or the like. Specifically, for example, a hard disk device, a flexible disk, a magnetic tape, or the like can be used as a magnetic recording device. A DVD (Digital Versatile Disc), a DVD-RAM (Random Access Memory), a CD-ROM (Compact Disc Read Only), a CD-R (Recordable)/RW (Re-Writable), or the like can be used as an optical disk. An MO (Magneto-Optical disc) or the like can be used as a magneto-optical recording medium. An EEP-ROM (Electronically Erasable and Programmable-Read Only Memory) or the like can be used as a semiconductor memory.

This program is distributed by, for example, selling, transferring, or lending a portable recording medium, such as a DVD or a CD-ROM, in which the program is recorded. Furthermore, a configuration may also be employed in which this program is stored in a storage device in a server computer, and is distributed by transferring the program from the server computer to other computers via a network.

For example, first, a computer that executes this program temporarily stores the program recorded in the portable recording medium or the program transferred from the server computer in a storage device of this computer. When executing the processing, the computer loads the program stored in its own storage device, and executes the processing in accordance with the loaded program. As another mode of executing this program, the computer may directly load the program from the portable recording medium and execute the processing in accordance with the program, or may sequentially execute the processing in accordance with a received program every time the program is transferred from the server computer to this computer. A configuration is also possible in which the above-described processing is performed through a so-called ASP (Application Service Provider)-type service that realizes processing functions only by giving instructions to execute the program and acquiring the results, without transferring the program to the computer. Note that the program in this mode may include information for use in processing performed by an electronic computer that is equivalent to a program (e.g., data that is not a direct instruction to the computer but has properties that define computer processing.

In this mode, the hardware entity is constituted by executing a predetermined program on a computer, but at least a part of the processing content may alternatively be realized by hardware.

The above description of the embodiment of the present invention has been presented for the purposes of illustration and description. There is no intention to be exhaustive, nor is there any intention to limit the invention to the exact form disclosed. Modifications and variations are possible from the above teachings. The embodiments have been chosen and expressed to provide the best illustration of the principles of the invention and to enable those skilled in the field to utilize the invention in a variety of embodiments and with various additional modifications to make the invention suitable for contemplated and actual use. All such modifications and variations are within the scope of the invention as set forth by the appended claims construed according to the fairly and legally given breadth.

The invention claimed is:

1. An identification-estimation risk assessment apparatus that calculates a risk assessment value of a risk that a record number r is identified and estimated as corresponding to a record number r' from an original table t, an anonymized table t', a record number r∈[N] in the original table t, and a record number r'∈[N] in the anonymized table t', wherein [N]={1, 2, . . . , N} (here, N is an integer of 1 or more) and a shuffle is a mapping of [N]→[N], the apparatus comprising:
   processing circuitry configured to execute;
   a first calculation processing for calculating a first value $\Sigma_\gamma Pr[\Delta(t)=t'\circ\gamma]$, which is a sum related to all shuffles of a probability $Pr[\Delta(t)=t'\circ\gamma]$ that a table $\Delta(t)$ obtained by anonymizing the original table t through randomization $\Delta$ coincides with a table t'∘γ represented as a composite of a shuffle γ and the anonymized table t';
   a second calculation processing for calculating a second value $\Sigma_{\gamma(r)=r'}Pr[\Delta(t)=t'\circ\gamma]$, which is a sum related to a shuffle that satisfies γ(r)=r' of the probability $Pr[\Delta(t)=t'\circ\gamma]$; and
   a third calculation processing for calculating, as the risk assessment value, a third value $\Sigma_{\gamma(r)=r'}Pr[\Delta(t)=t'\circ\gamma]/\Sigma_\gamma Pr[\Delta(t)=t'\circ\gamma]$ based on the first value $\Sigma_\gamma Pr[\Delta(t)=t'\circ\gamma]$ and the second value $\Sigma_{\gamma(r)=r'}Pr[\Delta(t)=t'\circ\gamma]$,
   wherein the risk assessment value represents the risk that the record number r is identified and estimated as corresponding to the record number r' by an attacker who has knowledge of the original table t.

2. The identification-estimation risk assessment apparatus according to claim 1, wherein the first calculation processing calculates the first value $\Sigma_\gamma Pr[\Delta(t)=t'\circ\gamma]$ using the following equation:

$$\Sigma_\gamma Pr[\Delta(t)=t'\circ\gamma]=\Sigma_\gamma \Pi_{i\in[N]} a_{i\gamma}(i), \qquad \text{[Math. 13]}$$

where $a_{ij}$ (i∈[N], j∈[N]) represents the probability that a record with a record number i in the original table t becomes a record with a record number j in the anonymized table t' through the randomization $\Delta$.

3. The identification-estimation risk assessment apparatus according to claim 2, wherein
   A is a matrix with the probability $a_{ij}$ as a (i, j)th element, and
   the second calculation processing calculates the second value $\Sigma_{\gamma(r)=r'}Pr[\Delta(t)=t'\circ\gamma]$ through pseudo-cofactor expansion of (r, r') for the matrix A.

4. The identification-estimation risk assessment apparatus according to claim 1, wherein the randomization $\Delta$ is PRAM.

5. An identification-estimation risk assessment method by which an identification-estimation risk assessment apparatus calculates a risk assessment value of a risk that a record number r is identified and estimated as corresponding to a record number r' from an original table t, an anonymized table t', a record number r∈[N] in the original table t, and a record number r'∈[N] in the anonymized table t', wherein [N]={1, 2, . . . , N} (here, N is an integer of 1 or more) and a shuffle is a mapping of [N]→[N], the method comprising:
   a first calculation step in which the identification-estimation risk assessment apparatus calculates a first value $\Sigma_\gamma Pr[\Delta(t)=t'\circ\gamma]$, which is a sum related to all shuffles of a probability $Pr[\Delta(t)=t'\circ\gamma]$ that a table $\Delta(t)$ obtained by anonymizing the original table t through randomization $\Delta$ coincides with a table t'∘γ represented as a composite of a shuffle γ and the anonymized table t';
   a second calculation step in which the identification-estimation risk assessment apparatus calculates a second value $\Sigma_{\gamma(r)=r'}Pr[\Delta(t)=t'\circ\gamma]$, which is a sum related to a shuffle that satisfies γ(r)=r' of the probability $Pr[\Delta(t)=t'\circ\gamma]$; and
   a third calculation step in which the identification-estimation risk assessment apparatus calculates, as the risk assessment value, a third value $\Sigma_{\gamma(r)=r'}Pr[\Delta(t)=t'\circ\gamma]/\Sigma_\gamma Pr[\Delta(t)=t'\circ\gamma]$ based on the first value $\Sigma_\gamma Pr[\Delta(t)=t'\circ\gamma]$ and the second value $\Sigma_{\gamma(r)=r'}Pr[\Delta(t)=t'\circ\gamma]$,
   wherein the risk assessment value represents the risk that the record number r is identified and estimated as corresponding to the record number r' by an attacker who has knowledge of the original table t.

6. A non-transitory computer-readable storage medium storing a program for causing a computer to perform an identification-estimation risk assessment method by which an identification-estimation risk assessment apparatus calculates a risk assessment value of a risk that a record number r is identified and estimated as corresponding to a record number r' from an original table t, an anonymized table t', a record number r∈[N] in the original table t, and a record number r'∈[N] in the anonymized table t', wherein [N]={1, 2, . . . , N} (here, N is an integer of 1 or more) and a shuffle is a mapping of [N]→[N], method comprising:
   a first calculation step in which the identification-estimation risk assessment apparatus calculates a first value $\Sigma_\gamma Pr[\Delta(t)=t'\circ\gamma]$, which is a sum related to all shuffles of a probability $Pr[\Delta(t)=t'\circ\gamma]$ that a table $\Delta(t)$ obtained by anonymizing the original table t through randomization Δ coincides with a table t'∘γ represented as a composite of a shuffle γ and the anonymized table t';

a second calculation step in which the identification-estimation risk assessment apparatus calculates a second value $\Sigma_{\gamma(r)=r'}Pr[\Delta(t)=t'\circ\gamma]$, which is a sum related to a shuffle that satisfies γ(r)=r' of the probability Pr[Δ(t)=t'∘γ]; and a third calculation step in which the identification-estimation risk assessment apparatus calculates, as the risk assessment value, a third value $\Sigma_{\gamma(r)=r'}Pr[\Delta(t)=t'\circ\gamma]/\Sigma_{\gamma}Pr[\Delta(t)=t'\circ\gamma]$ based on the first value $\tau_{\gamma}Pr[\Delta(t)=t'\circ\gamma]$ and the second value $\Sigma_{\gamma(r)=r'}Pr[\Delta(t)=t'\circ\gamma]$, wherein the risk assessment value represents the risk that the record number r is identified and estimated as corresponding to the record number r' by an attacker who has knowledge of the original table t.

7. The non-transitory computer-readable storage medium according to claim 6, wherein the first calculation step calculates the first value $\Sigma_{\gamma}Pr[\Delta(t)=t'\circ\gamma]$ using the following equation:

$$\Sigma_{\gamma}Pr[\Delta(t)=t'\circ\gamma]=\Sigma_{\gamma}\Pi_{i\in[N]}a_{i\gamma(i)} \qquad [\text{Math. 13}]$$

where $a_{ij}$ (i∈[N], j∈[N]) represents the probability that a record with a record number i in the original table t becomes a record with a record number j in the anonymized table t' through the randomization Δ.

8. The non-transitory computer-readable storage medium according to claim 7, wherein A is a matrix with the probability $a_{ij}$ as a (i, j)th element, and the second calculation step calculates the second value $\Sigma_{\gamma(r)=r'}Pr[\Delta(t)=t'\circ\gamma]$ through pseudo-cofactor expansion of (r, r') for the matrix A.

9. The non-transitory computer-readable storage medium according to claim 6, wherein the randomization Δ is PRAM.

* * * * *